(12) United States Patent
Semmlinger et al.

(10) Patent No.: US 7,975,897 B2
(45) Date of Patent: Jul. 12, 2011

(54) FRICTION WELDING MACHINE AND OPERATING METHOD

(75) Inventors: Wolfgang Semmlinger, Augsburg (DE); Otmar Fischer, Augsburg (DE); Günter Zott, Altenmünster (DE); Rudolf Huber, München (DE)

(73) Assignee: KUKA Systems GmbH, Augsburg (DE)

( * ) Notice: Subject to any disclaimer, the term of this patent is extended or adjusted under 35 U.S.C. 154(b) by 912 days.

(21) Appl. No.: 10/595,791

(22) PCT Filed: Jun. 16, 2005

(86) PCT No.: PCT/EP2005/006447
§ 371 (c)(1),
(2), (4) Date: May 11, 2006

(87) PCT Pub. No.: WO2006/000330
PCT Pub. Date: Jan. 5, 2006

(65) Prior Publication Data
US 2007/0101838 A1  May 10, 2007

(30) Foreign Application Priority Data

Jun. 23, 2004 (DE) .................... 20 2004 009 909 U

(51) Int. Cl.
*B23K 20/12* (2006.01)
*B23K 37/00* (2006.01)

(52) U.S. Cl. .......... 228/2.3; 228/2.1; 228/112.1
(58) Field of Classification Search ............ 228/2.1, 228/112.1, 2.3
See application file for complete search history.

(56) References Cited

U.S. PATENT DOCUMENTS

| | | | |
|---|---|---|---|
| 3,377,009 A | | 4/1968 | Lipp et al. |
| 3,439,853 A | * | 4/1969 | Deemie et al. ............... 228/2.3 |
| 3,536,242 A | * | 10/1970 | Gordon, Jr. et al. .......... 228/2.3 |
| 3,542,383 A | * | 11/1970 | Farley et al. ............... 279/2.03 |
| 3,954,215 A | * | 5/1976 | Takagi et al. ............... 228/2.3 |
| 4,030,658 A | | 6/1977 | Parrish |
| 4,733,814 A | | 3/1988 | Penman |

FOREIGN PATENT DOCUMENTS
DE 19745123 6/1999
* cited by examiner

*Primary Examiner* — Jessica L Ward
*Assistant Examiner* — Devang R Patel
(74) *Attorney, Agent, or Firm* — McGlew and Tuttle, P.C.

(57) ABSTRACT

A friction welding machine (1) has two headstocks (5, 6), two spindles (8, 9) with a spindle drive (12, 13) and a workpiece holder (22). The first headstock (5) is arranged stationarily at the frame (2). The second headstock (6) is mounted axially movably at the frame (2) and is connected to a feed drive (25). The spindles (8, 9) have different sizes, the second spindle (9) and its spindle drive (13) being designed to be smaller and weaker.

18 Claims, 3 Drawing Sheets

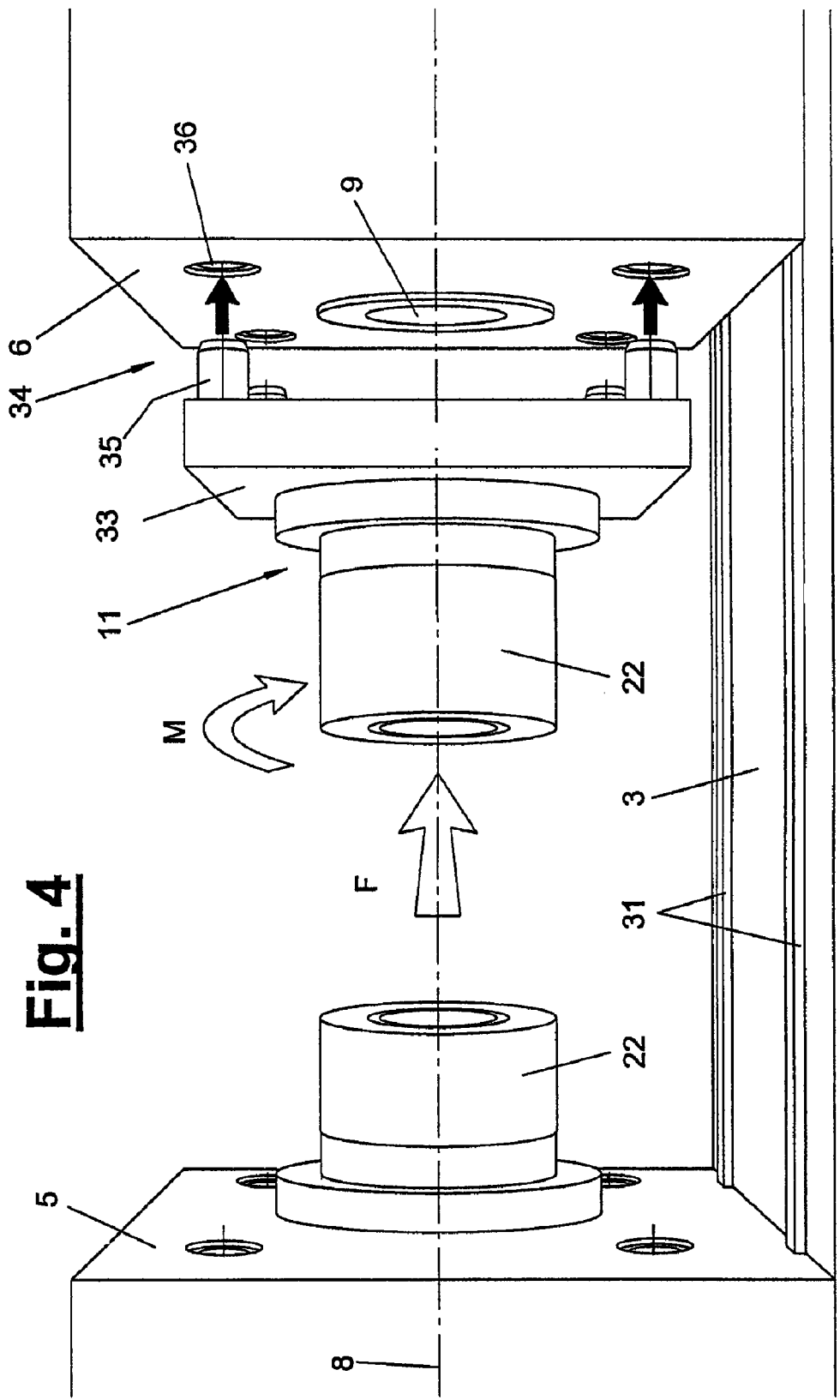

US 7,975,897 B2

FRICTION WELDING MACHINE AND OPERATING METHOD

CROSS REFERENCE TO RELATED APPLICATIONS

This application is a United States National Phase application of International Application PCT/EP 2005/006447 filed Jun. 16, 2005 and claims the benefit of priority under 35 U.S.C. §119 of German Application DE 20 2004 009 909.8 filed Jun. 23, 2004, the entire contents of which are incorporated herein by reference.

FIELD OF THE INVENTION

The present invention pertains to a friction welding machine and an operating method

BACKGROUND OF THE INVENTION

Such a friction welding machine is known from practice and is used to weld together two workpieces. It comprises a frame with a stationary headstock, which has a spindle with a workpiece holder for the first workpiece and a spindle drive. The second workpiece is mounted with a second workpiece holder, which is connected to a feed drive, which ensures the feed, the frictional feed and the forge stroke. The second workpiece holder is arranged nonrotatingly in the prior-art friction welding machine. The prior-art friction welding machines are designed for certain workpiece sizes and have a limited field of application. Different friction welding machines are necessary for greatly different workpiece sizes.

SUMMARY OF THE INVENTION

The object of the present invention is to show a better friction welding technique.

According to the invention, a friction welding machine is provided with a frame, with a headstock, which has a spindle with a workpiece holder and with a spindle drive, and with a feed drive with a second workpiece holder. A second headstock is provided with a spindle, with a spindle drive and with the second workpiece holder. The second headstock is mounted axially movably at the frame and is connected to the feed drive.

According to another aspect of the invention, a process is provided for operating a friction welding machine with a plurality of headstocks with spindles, spindle drives and workpiece mounts. A feed drive is provided for one of the headstocks to provide a movably mounted headstock. One spindle is relieved of axial forging and welding forces F and the torque M with a bridge during the welding operation.

The double-spindle machine according to the invention and the operating method according to the invention have the advantage of increased field of application. It is suitable for a substantially broader range of workpiece sizes. This is also beneficial for accuracy.

The spindle diameters may be equal or different. The smaller spindle for the smaller components can be mounted more accurately than the large spindle and it offers a correspondingly greater precision.

To withstand the strong forge forces and torques, bridges may be present, which support the workpiece holders at the housing of the headstock preferably in a positive-locking manner and relieve the spindle. This offers advantages especially in case of the smaller spindles, but it is also favorable in case of spindles of equal size. The bridge may be replaceable and arranged optionally at one or the other of the spindles or at the headstock. The bridge is provided with a workpiece holder, which is mounted rigidly at a carrying body and is replaced with the spindle-side removable workpiece holder.

The friction welding machine according to the invention offers, furthermore, advantages for controlling and affecting the friction welding process. The two spindles may rotate in opposite directions, so that the speed of rotation acting at the site of friction may be greater than in prior-art machines. On the other hand, the individual velocities of the two spindles can be reduced due to the addition of the velocities, which makes it possible, on the one hand, to reduce the size of the spindle drives and makes possible, on the other hand, a faster braking. The friction welding process can be correspondingly controlled more sensitively and accurately. Advantages also arise for the angular positioning of the workpieces in the welding position. A workpiece can be held nonrotatingly with the stationarily supported bridge while it is uncoupled from the spindle.

Despite the fact that the fields of application and the range of workpieces are enlarged due to the double spindles, the friction welding machine makes do with a uniform feed drive, which covers all fields of application.

The drive technology for the two spindles and the headstocks may have the same design or different designs. The fields of application of the spindle drives can also be expanded and adapted to workpieces of different sizes and weights by means of flywheel masses that can be set or coupled. The friction welding machine may be operated now optionally with direct drives or with flywheel drives.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a side view of a bridge.

DESCRIPTION OF THE PREFERRED EMBODIMENT

Figure 1:
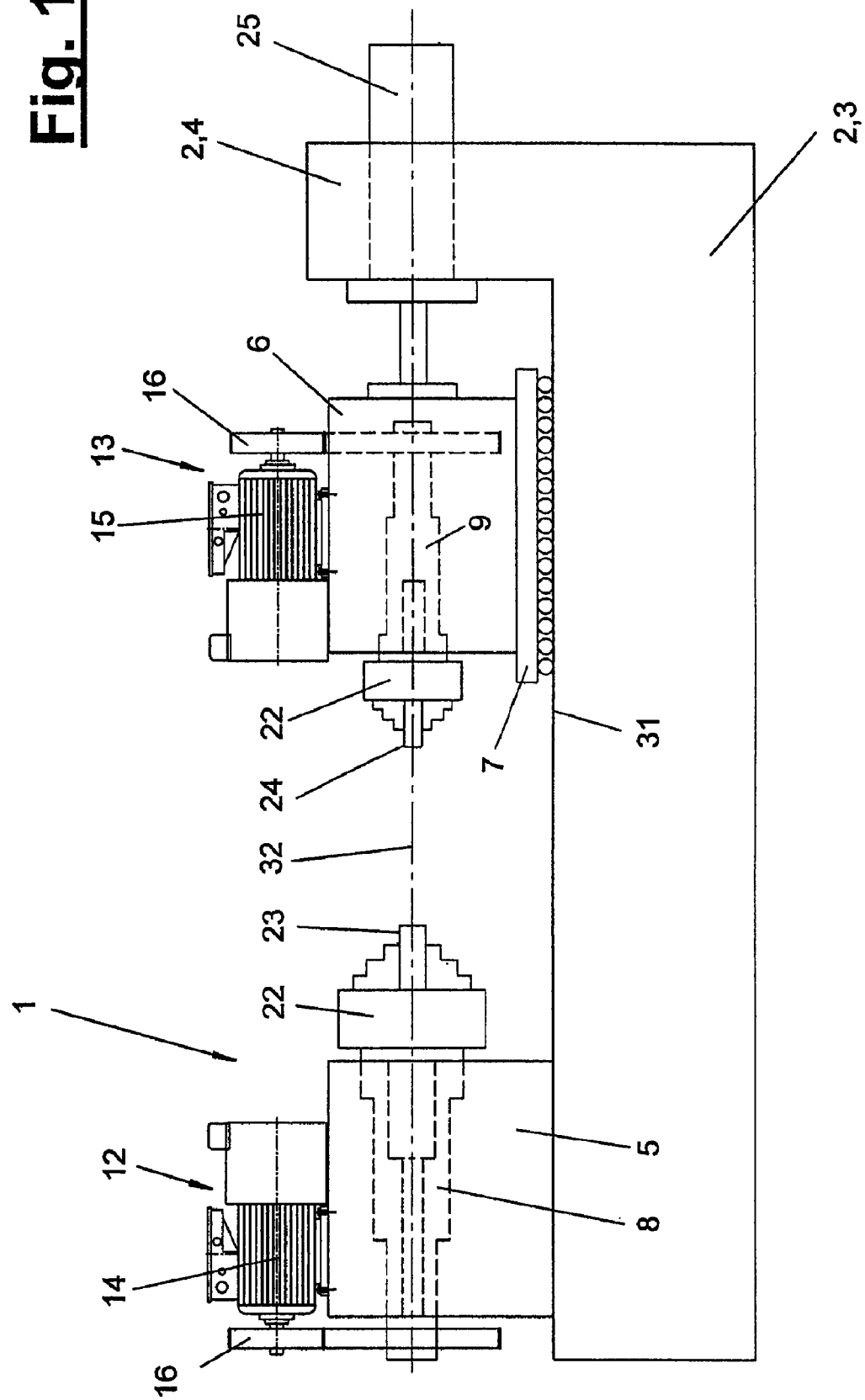
FIG. 1 is a schematic side view of a double-spindle friction welding machine.
Figure 2:
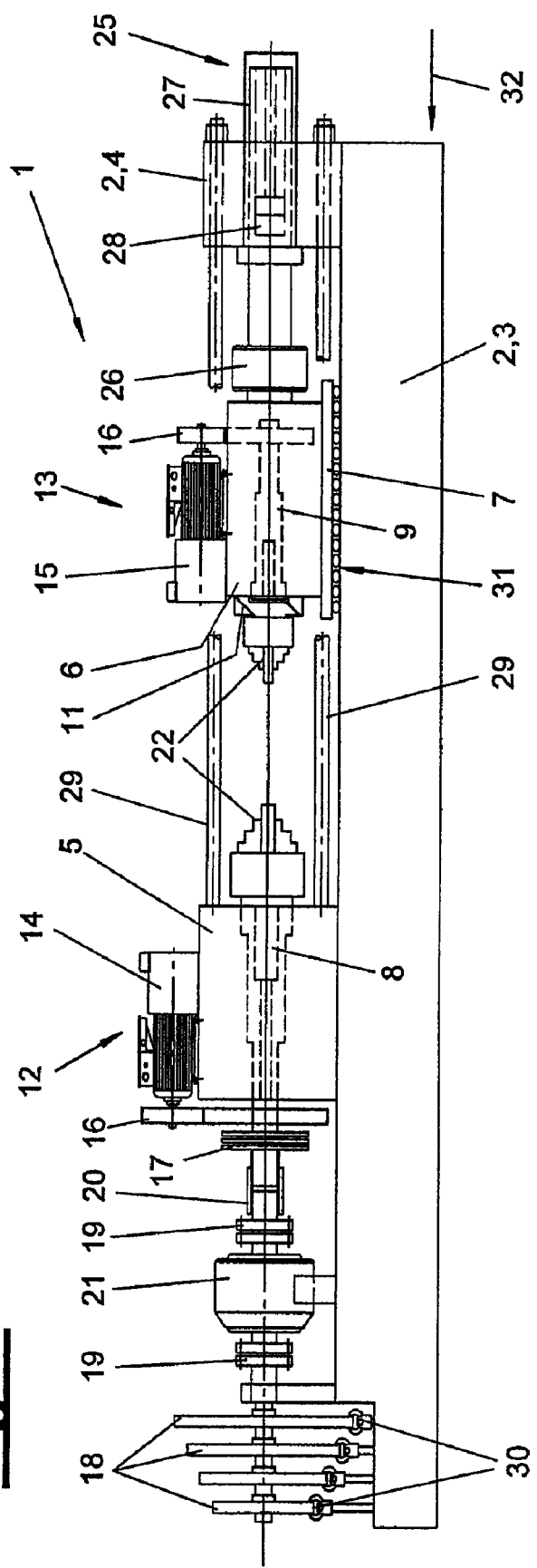
FIG. 2 is a schematic side view showing a variant of the friction welding machine from FIG. 1 with flywheel drives and a bridge for welding large workpieces.

Referring to the drawings in particular, FIGS. 1 and 2 show a friction welding machine (1) designed as a double-spindle machine and two design variants, which differ in terms of the spindle drives (12, 13).

The friction welding machine (1) comprises in both cases a frame (2), which has a machine bed (3) and an upright column (4) at one end. A first, preferably stationary headstock (5) or spindle head, which has a spindle (8) with a workpiece holder (22), preferably a chuck, and with a spindle drive (12), is mounted stationarily on one side. The chuck (22) receives the first workpiece (23).

A second headstock (6) or spindle head with a second spindle (9) and with a spindle drive (13) of its own as well as with a second workpiece holder (22) for receiving the second workpiece (24) is arranged opposite the first stationary headstock (5) at a spaced location. The second headstock (6) is mounted movably at the frame (2), especially at the machine bed (3), by means of a traveling carriage (7). The second headstock (6) is connected to a feed drive (25) on the rear side.

In the embodiment being shown, the second, mobile headstock (6) has a spindle (9) that has a smaller diameter and can be loaded with a lower load and preferably also a weaker spindle drive (13) than the stationary headstock (5). The smaller spindle (9) is correspondingly mounted more accurately than the large spindle (8). The spindles (8, 9) with the chucks (22) have a common central axis, with which the feed drive (25) is also flush.

In a variant of the embodiment shown, the second spindle (9) may have the same size and the same mounting as the first spindle (8). The spindle drives (12, 13) may also have a similar design and be dimensioned for the same strength and load-bearing capacity. The great similarity of the spindle drives (12, 13) may also be given in case of different spindles (8, 9) in another variation.

The traveling carriage (7) is mounted and guided in a positive-locking manner along the direction of feed (32) by means of a carriage guide (31) at the frame (2) or the machine bed (3). The mounting absorbs the tilting moments that may act.

The feed drive (25) is arranged and supported behind the mobile headstock (6) at the said column (4). The feed drive (25) ensures, on the one hand, the rapid feed of the mobile headstock (6) from the withdrawn inoperative position shown in FIG. 1 into the advanced working position, in which the two workpieces (23, 24) are brought into aligned frictional contact and rotated in relation to one another. The feed drive (25) ensures, furthermore, the frictional feed and ultimately also the forge stroke, with which the workpieces (23, 24) are abruptly connected. The feed drive (25) may have any desired and suitable design. In the exemplary embodiment shown, which is shown in greater detail in FIG. 2, it has two hydraulic cylinders (26, 28). The cylinder (28) located in the rear in the direction of feed is a quick motion cylinder, which is connected to an forge rod (27). As an alternative, the feed drive (25) may also be an electric motor drive or have any other desired design.

To support the strong forge forces, which may be, e.g., between 20 and 100 tons or more, the stationary headstock (5) and the column (4) are connected to one another by one or more axial tie rods (29) in the direction of feed and forging (32) and mutually supported. The frame (2) can be relieved as a result.

The spindle drives (12, 13) may have any desired suitable design and optionally also different designs. In the exemplary embodiment being shown, both spindle drives (12, 13) have an electrically controllable drive motor (14, 15), which acts on the corresponding spindle (8, 9) via an intermediate gear. This is a direct drive in the exemplary embodiment according to FIG. 1, and the intermediate gear (16) is coupled directly with the respective spindle (8, 9).

FIG. 2 shows a variant of the drive design with a freely selectable possibility of engaging one or more flywheel masses (17, 18). The flywheel masses (17, 18) can be uncoupled when needed, so that the above-mentioned direct drive is present.

One or two, and optionally even more settable flywheel masses (17) may be arranged coaxially with the spindle (9) in the case of the mobile headstock (6) with the smaller spindle (9) and the smaller chuck (22). The flywheel mass (17) can be engaged and connected to the spindle (9) individually or together via a corresponding coupling.

More flywheel masses (17, 18) are present at the stationary headstock (5) with the large spindle (8), and these flywheel masses also offer a broader range of possibilities of engagement. Similarly to the smaller headstock (6), two or more settable flywheel masses are arranged at the rearward end of the spindle (8), and these flywheel masses can be directly connected to the rearward end of the spindle (8). The large spindle (8) may, furthermore, be mounted in another column part at the rearward end and connected to a downstream gear mechanism (21) via a shiftable coupling means (20). A connection (19) that is rigid in terms of rotation may be inserted here. The gear mechanism (21) is connected, on the one hand, at the rearward end, to an arrangement of a plurality of additional flywheel masses (18), which are designed as flywheel masses of different sizes and weights that can be engaged individually. The individual flywheel masses (18) can be braked and fixed when needed by means of stopping brakes (30).

One or both spindles (8, 9) may be equipped with bridges (10, 11), which are inserted between the workpiece holders or chucks (22) and the adjoining wall of the headstock (5, 6) and support the forging and compressive forces F as well as torques M acting on the chuck (22) to relieve the corresponding spindle (8, 9) at the headstock housing. The bridges (10, 11) are arranged at the respective nonmoving spindle (8, 9).

FIG. 2 shows the embodiment for welding large and heavy workpieces (23, 24). The large spindle (8) rotates at the stationary headstock (5) in this variant. The opposite small spindle (9) is supported and relieved by the bridge (11) rigidly in relation to the housing. The bridge (11) may optionally also now hold the chuck (22) nonrotatingly.

Figure 3:
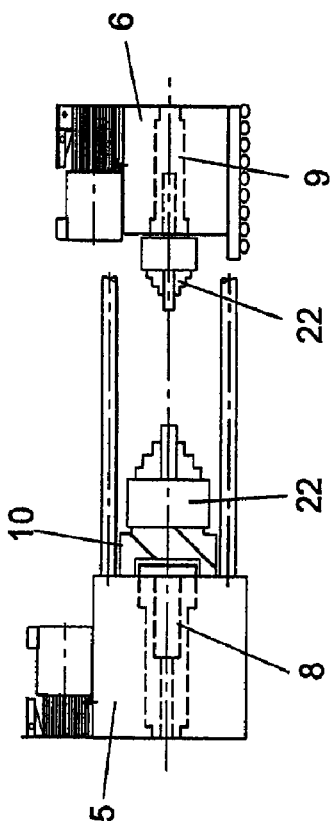
FIG. 3 is a cut-away view of the spindles in the variant for welding small workpieces.

The other arrangement for welding smaller workpieces (23, 24) is shown in the variant according to FIG. 3. The smaller spindle (9) moves in this case at the mobile headstock (6). A bridge (10), which relieves the large spindle (8), is arranged at the larger, stationary headstock (5) between the chuck (22) and the headstock housing. In a variant of this embodiment, the large bridge (10) may optionally be done away with and the large spindle (8) can be stopped only with a suitable brake during forgoing. The spindle mount may be designed to be so robust that it withstands the mostly reduced forge forces for smaller workpieces even without a bridge (10).

The double-spindle friction welding machine (1) may be operated in different modes of operation. Only one spindle (8, 9) rotates in the conventional modes, while the respective other spindle (9, 8) is stopped nonrotatingly by a brake. Only the respective rotating spindle drive (12, 13) is correspondingly actuated by the machine and process control (not shown). It is possible in a third mode to allow both spindles (8, 9) to rotate, which happens, e.g., in opposite directions. The opposite velocities add up as a result at the friction site to a high relative speed of rotation of the workpieces (23, 24). Both spindles (8, 9) are correspondingly braked at the end of the friction process and before the forge stroke, and weaker braking forces are necessary due to the reduction of the individual speeds of rotation, or faster braking is possible. Only the one, rotating spindle (8, 9) is braked at the end of the friction process in the first two modes of operation.

In another variation, the spindles (8, 9) may also rotate in the same direction if needed, and the corresponding spindle (8, 9) is also carried in a frictionally engaged manner by the other, driven spindle (9, 8) if one spindle drive (12, 13) is switched off.

FIG. 4 shows a design embodiment of a bridge (11). It comprises an, e.g., plate-shaped carrying body (33), on the front side of which a workpiece mount (22) is rigidly mounted. A positive-locking support (34) is present on the rear side for connection to the headstock (5, 6). This [support] comprises, e.g., the four, rearwardly projecting pins (35) shown, which engage corresponding mounting openings (36) at the headstock (5, 6) in a positive-locking manner. The axial forging or welding forces F are supported by the flat contact of the carrying body (33) with the headstock (5, 6). The torque or welding moment M generated during the friction welding is supported by the positive-locking support (34). The spindle (8, 9) is not loaded. The connection of the bridge (11) and the headstock (5, 6) can be secured with a locking mechanism (not shown).

The bridge (11) is replaced in this embodiment with the workpiece holder (22) normally present at the spindle (8, 9). The workpiece holders (22) are attached for this purpose detachably to the spindles (8, 9) and can be removed to mount the bridge (11). The spindles (8, 9) are arranged and mounted here in their headstocks (5, 6) such that they project axially only slightly if at all over the front wall of the headstock (5, 6) with their front ends when the workpiece mount (22) is removed. The carrying body (33) may otherwise also have a corresponding mounting opening on the rear side. After the workpiece mount (22) has been removed from the spindle (8, 9), the bridge (11) can be mounted on the headstock (5, 6) and placed over the spindle end. The arrangement of the workpiece mount (22) and of the positive-locking support (34) at the bridge (11) is concentric with the aligned spindle axes.

The workpiece mounts (22) at the spindles (8, 9) and at one or more bridges (11) may have essentially the same design. This is favorable in light of the mutual replaceability of the workpiece mounts (22) on the spindles (8, 9). In addition, the same bridge (11) may be attached on one or the other of the headstocks (5, 6) as desired. The headstocks (5, 6) also have similar components of the positive-locking mount (34) for this. It is also advantageous to make uniform the connections between the spindles (8, 9) and the workpiece mounts (22). This makes it possible to mutually replace the workpiece mounts (22). In addition, different types and sizes of workpiece mounts (22) can be arranged on one or the other of the spindles (8, 9) as desired.

Various modifications of the embodiments shown are possible. This pertains to the design embodiment of the headstocks (5, 6), the spindles (8, 9) thereof and the spindle drives (12, 13) thereof. The feed drive (25) may be varied as well. Depending on the value of the forge forces, the tie rod (29) may be done away with in favor of supporting the forces via the frame (2). Furthermore, the size ratios are also variable in the different diameters of the small and large spindles (8, 9). The first headstock (5) may be mounted movably and lockably at the frame (2). Furthermore, the design of the bridges (11) is variable as well. This pertains to the shape and the arrangement of the carrying bodies (33) and the positive-locking support (34), and, in particular, the assignment of pins (35) and mounting openings (36) may be transposed. Furthermore, any other desired type of support, possibly even a purely non-positive support, is possible. Furthermore, the bridge (11) may also be embodied while leaving the workpiece mount (22) at the spindle (8, 9) by means of an insert or a shoe, which is introduced into the gap between the rear side of the workpiece mount (22) and the front side of the headstock (5, 6) and cooperates with corresponding, preferably positive-locking supports on both parts. The workpiece mount (22) is thus supported at the headstock (5, 6) in a compression-proof and nonrotatable manner and relieves the spindle (8, 9). The connection between the spindle (8, 9) and the workpiece mount (22) may optionally be loosened or opened now.

While specific embodiments of the invention have been shown and described in detail to illustrate the application of the principles of the invention, it will be understood that the invention may be embodied otherwise without departing from such principles.

The invention claimed is:

1. A friction welding machine comprising:
   a frame;
   a first headstock, which has a first spindle with a first workpiece holder and with a spindle drive;
   a feed drive with a second workpiece holder;
   a second headstock with a second spindle, with a spindle drive and with said second workpiece holder, wherein said second headstock is mounted axially movably at said frame and is connected to said feed drive, wherein at least one of said first workpiece holder and said second workpiece holder has a bridge, said bridge receiving a torque and a forge force during friction welding such that at least one of said first spindle and said second spindle does not receive the forge force and the torque produced via the friction welding, said bridge having a carrying body and a positive-locking support for connection to at least one of said first headstock and second headstock.

2. A friction welding machine in accordance with claim 1, wherein said first headstock is arranged stationarily at said frame.

3. A friction welding machine in accordance with claim 1, wherein said spindles have different sizes.

4. A friction welding machine in accordance with claim 3, wherein said spindle of said second spindle drive is smaller than said other spindle.

5. A friction welding machine in accordance with claim 1, wherein said second spindle drive is weaker than said first spindle drive.

6. A friction welding machine in accordance with claim 1, wherein a workpiece holder is mounted rigidly at said bridge.

7. A friction welding machine in accordance with claim 1, wherein said positive-locking connection has pins and openings that engage each other at said carrying body and said at least one of said first headstock and second headstock.

8. A friction welding machine in accordance with claim 1, wherein at least one said workpiece holder is detachably connected to a spindle.

9. A friction welding machine in accordance with claim 1, wherein said spindles and said bridge have said similar workpiece holders.

10. A friction welding machine in accordance with claim 1, wherein said second headstock has a traveling carriage, which is mounted and guided in a positive-locking manner at a carriage guide at said frame along a direction of feed.

11. A friction welding machine in accordance with claim 1, wherein said feed drive is mounted and supported at a column of said frame.

12. A friction welding machine in accordance with claim 11, wherein said column and said stationary headstock are connected by one or more said tie rods.

13. A friction welding machine in accordance with claim 1, wherein said feed drive has one or more said cylinders.

14. A friction welding machine in accordance with claim 1, wherein said spindle drives have electric drive motors.

15. A friction welding machine in accordance with claim 1, wherein at least one said spindle drive has settable flywheel masses.

16. A friction welding machine in accordance with claim 1, wherein said stationary spindle drive has one or more additional flywheel masses that can be coupled.

17. A process for operating a friction welding machine, the process comprising:
- providing the welding machine with a plurality of headstocks with spindles, spindle drives and workpiece mounts;
- movably mounting one of said headstocks to provide a movably mounted headstock;
- providing a feed drive for moving the movably mounted headstock ; and
- providing a bridge connected to one of said head headstocks, wherein one of said spindles is relieved of axial forge and welding forces and torque with the bridge during a welding operation, said workpiece mount being removed from said spindle that is to be relieved, and said bridge with a workpiece mount attached thereto is placed over said spindle and connected to said headstock by means of a support.

18. A friction welding machine comprising:
a frame;
a first headstock having a first spindle with a first workpiece holder and a first spindle drive, said first spindle drive being mounted on said first headstock;
a feed drive with a second workpiece holder, wherein a portion of said feed drive is in contact with said frame;
a second headstock having a second spindle drive mounted thereto and a second spindle, said feed drive extending through said second headstock such that second workpiece holder is located on one side of said second headstock, said second headstock being mounted for movement such that said second headstock is movable in an axial direction on said frame, wherein at least one of said first workpiece holder and said second workpiece holder has a bridge connected thereto, said bridge receiving a torque and a forge force during friction welding such that at least one of said first spindle and said second spindle does not receive the forge force and the torque produced via the friction welding.

* * * * *